United States Patent
Dean et al.

(10) Patent No.: US 6,336,101 B1
(45) Date of Patent: Jan. 1, 2002

(54) TRACKING OF COMPUTER COMPONENTS ALLOCATED DURING CONFIGURATION OF COMPUTER SYSTEMS AND NETWORKS BY A SIMPLIFIED USER FRIENDLY CONFIGURATION PROCESS

(75) Inventors: Jeffrey Randell Dean; Jeffrey Langdon Howard; Ingrid Milagros Rodriguez, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,954

(22) Filed: Sep. 24, 1998

(51) Int. Cl.$^7$ ........................ G06R 153/00; G06R 17/30
(52) U.S. Cl. ............................................. 705/29; 705/8
(58) Field of Search ............................ 705/29, 8, 1, 28

(56) References Cited

U.S. PATENT DOCUMENTS

| | | | | |
|---|---|---|---|---|
| 4,852,001 A | * | 7/1989 | Tsushima et al. ............... 705/8 |
| 4,937,743 A | * | 6/1990 | Rassman et al. ............... 705/8 |
| 5,006,983 A | * | 4/1991 | Wayne et al. ................... 705/8 |
| 5,040,123 A | * | 8/1991 | Barber et al. .......... 364/468.06 |
| 5,237,495 A | * | 8/1993 | Morii ............................. 705/8 |
| 5,241,465 A | * | 8/1993 | Oba et al. ...................... 705/8 |
| 5,260,868 A | * | 11/1993 | Gupta et al. ........... 364/468.06 |
| 5,265,006 A | * | 11/1993 | Asthana et al. ................. 705/8 |
| 5,270,920 A | * | 12/1993 | Pearse et al. ................... 705/8 |
| 5,289,370 A | * | 2/1994 | Lirov ............................. 705/8 |
| 5,301,106 A | * | 4/1994 | Hersum ......................... 705/8 |
| 5,311,423 A | * | 5/1994 | Clark ............................. 705/8 |
| 5,657,453 A | * | 8/1997 | Taoka et al. ................... 705/1 |
| 5,815,395 A | * | 9/1998 | Hart et al. ............. 364/468.17 |
| 5,930,770 A | * | 7/1999 | Edgar ........................... 705/28 |
| 5,963,919 A | * | 10/1999 | Brinkley et al. .............. 705/28 |

* cited by examiner

Primary Examiner—Robert W. Downs
Assistant Examiner—Geoffrey Akers
(74) Attorney, Agent, or Firm—J. B. Kraft; Leslie A. Van Leeuwen (57) ABSTRACT

A user interactive display computer process and program, provided by a distributer of computer components to a seller of computer systems, for configuring computer systems and networks including the computer components. The process involves prompting system purchasers to make a sequence of interactive data entries, each of said entries relative to the data processing needs of the purchaser using one of said computer systems and networks and then allocating the computer components to the networks and systems based upon said user entries. The quantities of the computer components thereby allocated to computer systems sold by said seller to said purchasers during a selected time period are tracked and stored. Then, a determination is made as to whether the quantities of components thereby allocated during the time period exceed a selected level and if the level is exceeded, fees due from said seller to said distributer for said process are foregone.

14 Claims, 10 Drawing Sheets

Backup Schedule

Your data will automatically be backed up at the times you indicate below. Online backup means your data will be copied to a computer system at another location. Tape backup means your data will be copied to magnetic tape and stored at another location. Backup should be done at a time when people are not working on the system. Type the times below that are outside of your normal working hours.

Scheduling

How early do employees start work?
6:00AM — 67

How late do employees leave work?
8:30PM — 68

How often do you want to back up your data?
Sundays Only

Help | < Back | Next > | Cancel

FIG.6

Data Security

To make sure that your data is secure, you will be asked to type a key (password) to access the data that Connected Online Backup has stored for you. The key can be any combination of up to ???? characters, with no spaces. For future reference, make a note of the key and indicate if you have used upper or lower case characters. For added safety, you can store a copy of the key with the Connected Online Backup service by checking the box below.

Data Encryption

Key [xxxx] — 69
Retype Key [xxxx]
Store the Key Offsite also [ ]
— 70

Help | < Back | Next > | Cancel

TRACKING OF COMPUTER COMPONENTS ALLOCATED DURING CONFIGURATION OF COMPUTER SYSTEMS AND NETWORKS BY A SIMPLIFIED USER FRIENDLY CONFIGURATION PROCESS

CROSS-REFERENCE TO RELATED PATENT APPLICATIONS

The following copending patent applications which are assigned to the assignee of the present invention, cover subject matter related to the subject matter of the present patent application: Ser. No. 09/118,208, "Configuring Computer Network Operations Based Upon the Correlation of a Sequence of Interactive Display User Entries Apparently Unrelated to Computer Operations", Casey, Dean and Rodriguez; Ser. No. 09/118,560, "A Network With Storage of All Client Computer Programs in a Server Computer Having Customized Client Graphical User Interfaces With Maximum Sharing of Stored Portions of Interfaces Common to Multiple Clients", Rodriguez; Ser. No. 09/118,210, "Configuring Computer Network Operations Based Upon a Sequence of Interactive User Entries Into a Network Server Computer With a One Time Entry of Data Commonly Required by Multiple Clients", Casey, Dean, Howard and Rodriguez; and Ser. No. 09/118,211, "Simplified Setting Up of a Network of a Server Computer Preloaded With All Computer Programs Required by a Group of Client Computers to be Connected Into Network", Casey, Dean and Rodriguez, all filed on Jul. 17, 1998 and Ser. No. 09/078,934, Benzanson, Chuang and Rodriguez, filed May 14, 1998, "A Stored File of Recorded Keystrokes and Cursor Selections for Controlling Automatic Installation and Configuration of Programs and Components in a Network of Server and Client Computers".

TECHNICAL FIELD

The present invention relates to a process and program for the configuration of a computer systems and particularly networks such as local networks of server computers and client computers in a manner which is expeditious and involves very little down time of the system or network.

BACKGROUND OF THE INVENTION

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the e Internet. As a result of these changes, it seems as if virtually all aspects of human productivity in the industrialized world require human/computer interaction. The computer industry has been a force for bringing about great increases in business and industrial productivity. Almost every week seems to bring computer industry advances which promise even further increases in productivity. These advances offer to drive down business and industry costs and increase efficiency in addition to increasing productivity. In addition, the cost of "computer power" continues to drop as result of rapid advances in computer related technologies.

Despite all of these advantages there still remains great resistance in all industries and business fields to new computer systems and significant system upgrades which offer much in productivity increases. This resistance results from past experience which equates to installing new computer systems or significant upgrades in existing systems with large amounts of down time, during which the business, manufacturing facility or individual worker functions are inoperative or operate at diminished levels. When a business or production facility is trying to decide whether to install a new computer system, the concern about down time, the possible loss of business, as well as stress on the workers involved very often outweighs the cost of the installation in influencing the decision. The concern about business and production delays resulting from installation has become so great that fewer and fewer small businesses are trying to make system and program changes on their own. This concern is even greater when the business is considering the installation of a computer network. While many businesses would likely be much more productive if their computers were interconnected with each other, the thought of a network may be very frightening to many small businesses without too much computer experience.

As a result of these needs, the professional computer service industry which carries out and supports installations and upgrades for the business and industrial sectors has been rapidly expanding over the past decade. However, even with such computer professional support, the threat of such down time, coupled with the costs of such professional services caused by installation delays, remains of great concern.

Because of this expanding demand for computer and network installations, many major installation and service providers have been expending great amounts of research and development efforts to develop systems and programs to expedite such computer system and network configuration installation and upgrades. Many of the major installation and service providers are also manufacturers and distributors of computer components, both hardware and software. In such cases, the providers are usually adequately compensated for their expenditures by the sale of their components used in the systems. On the other hand, there has arisen substantial numbers of seller or "reseller" computer installation organizations which market the installation and upgrade of computer systems and networks to businesses. Since businesses demand and expect the best total solutions for their needs from such resellers, it is often the case that the best computer system or network that the reseller installs uses few or no computer components manufactured or distributed by the developer and owner of the system and programs used to configure the system or network. The result is a dilemma for those involved in the installation and configuration of computer systems and networks. It would be advantageous for everyone in the industry to continue to use the programs and systems for the configuration of networks and to encourage the development of even more advanced systems and programs to do so. On the other hand, a way should be found for compensating the developers of such programs for their efforts. One approach would be to charge the sellers or resellers of such programs set fees for their use. However, in this regard, the manufacturers and distributors who developed the configurations have valid concerns that any basic fee costs would discourage the use of such programs and, thus, the consequent sale of their computer components.

SUMMARY OF THE INVENTION

The present invention affords a solution to the above problems in which the distributer or manufacturer of the computer components, which has developed the process for configuring computer systems or network, provides to the seller or reseller a configuration process comprising a prompting system or computer purchasers to make a sequence of interactive data entries, each of said entries relative to the data processing needs of the purchaser of one of said computer systems, allocating said computer components to said computer systems based upon said user entries, tracking the quantities of said computer components thereby allocated to computer systems sold by said seller to said purchasers during a selected time period, and determining to forego fees due from said seller to said distributer for said process when said quantities of components thereby allocated during said time period exceed a selected level.

The present invention may be most advantageously used when the computer system or network configuration process is of the type described in the above cross-referenced copending patent applications, 09/118,208, 09/118,211, 09/118,210 and 09/118,560, all filed on Jul. 17, 1998. Because such configuration processes already involve considerable tracking and storage of data relative to the computer components selected for the various systems and networks being configured, it only requires little additional resources to relate the quantities or types of components sold for or used in the configured systems to the manufacturer or distributer. The present invention is advantageously used in the processes of these copending applications when the data entries being made relate to demographic aspects of the business environment of the purchaser of the computer system or network.

The invention is further applicable when the allocated computer components are of different types, the quantities of each of the different types are tracked, and the fees are determined to be foregone when the quantity of at least one of the different types of components allocated during said time period exceed selected levels.

BRIEF DESCRIPTION OF THE DRAWINGS

FIGS. 3 through 10 are a series of dialog panels prompting users to make some typical illustrative data entries which the process involving the present invention uses to make allocation of computer components;

DETAILED DESCRIPTION OF THE PREFERRED EMBODIMENT

Figure 1:
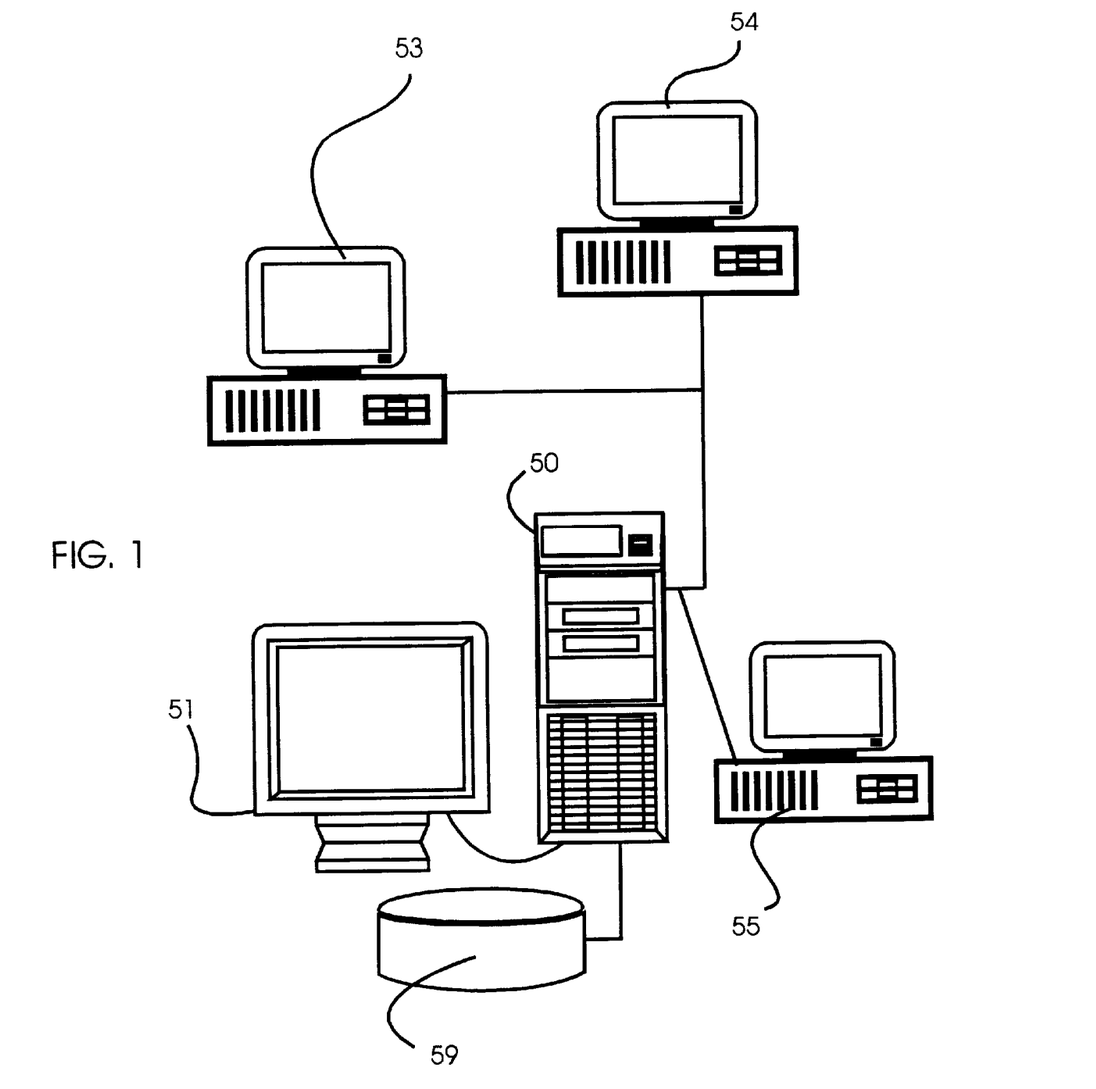
FIG. 1 is a generalized diagrammatic view of a network of server and client computers which may be configured by a distributer provided process tracking computer component levels according to the present invention.

With reference to FIG. 1 there is shown a representative diagram of a local network which was used to illustrate the network configuration process of the above-referenced copending patent application Ser. No. 09/118,208 involving allocation of computer components. The present invention, involving the tracking of the allocated computer components, will be illustrated with respect to this embodiment. There is a server computer 50 which has a plurality of client computers: clients 53, 54 and 55. As will be subsequently described with respect to FIGS. 3 through 7, all configuration entries and settings are made into and stored in server 50 through its display interface 51. With respect to the allocation of software computer components, as will be seen from the subsequent description, all of the programs to be used in the overall network are stored in association with server 50, e.g. in its storage facility 59, and then distributed as needed to the network users who will sign onto the client computers 53 through 55. The server 50 will allocate the appropriate programming applications to the signed-on users at the appropriate client computers. The programs to be subsequently described which track the allocation of such software components will store the allocation data in storage facility 59. As will be described in the details of server 50 with respect to FIG. 2, the server has access to networks such as the Internet, and additional components needed for any configuration may be accessed over such networks. Even when all of the components are software computer components, e.g. programs used are stored in server 50, the number and types of allocated software programs may, of course, vary since such numbers are measured by the number of times the process makes copies of such software for the multiple users to whom such programs are being allocated. The process of the invention tracks the types and quantities of the software programs used and stores this information conveniently in storage facility 59.

The process of the present invention also allocates and tracks hardware components including displays, printers, disk drives and other storage devices, as well as internal computer components. The allocated hardware may be installed into the network being configured from local inventories or the components may be shipped to the reseller for installation. In any case, data on the types and quantities allocated is tracked and stored.

Figure 2:
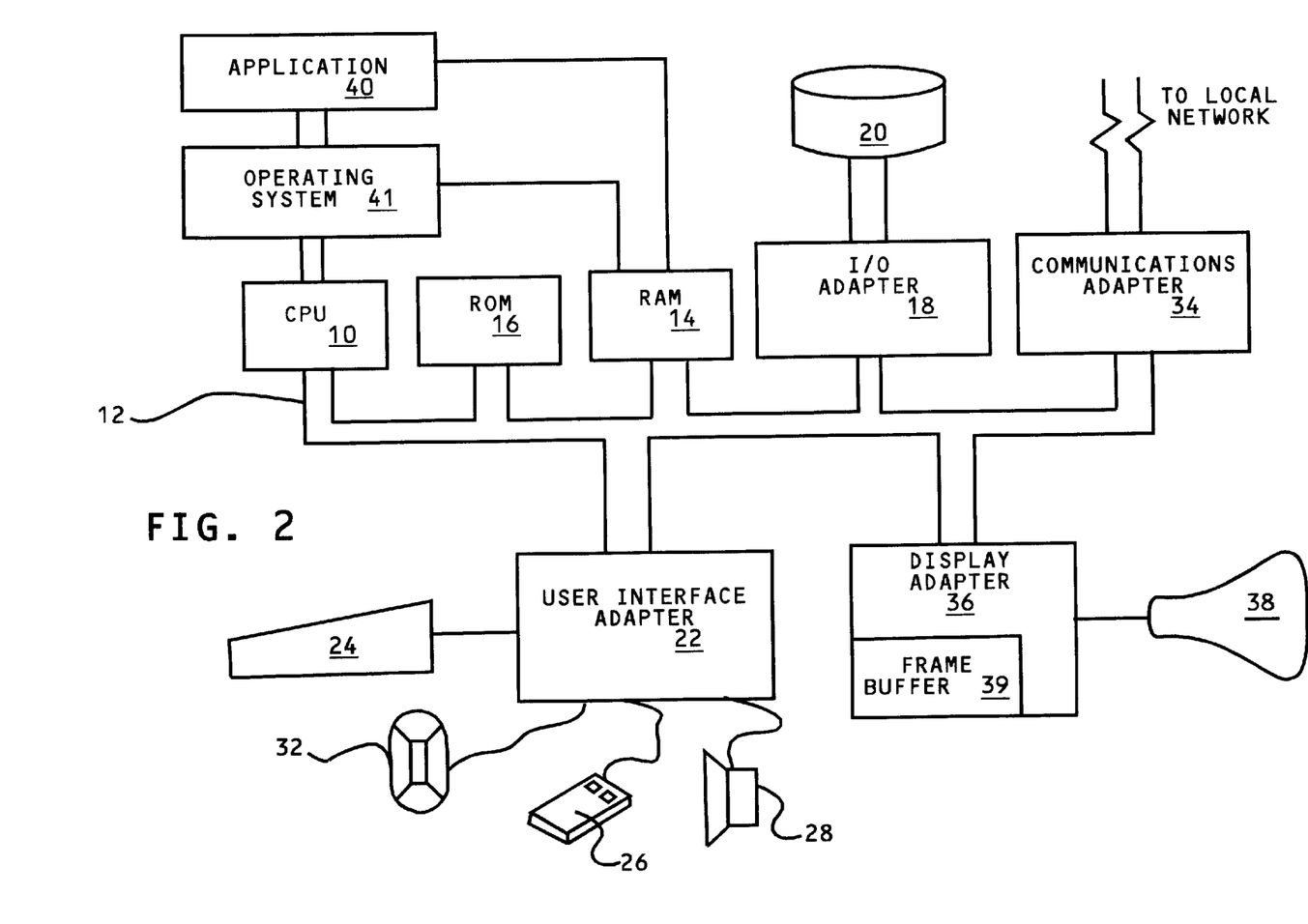
FIG. 2 is a block diagram of an interactive data processor controlled workstation display system including a central processing unit which is capable of serving as the primary server in the network of FIG. 1.

FIG. 2 is a diagram of a display interface workstation which can function as the primary server 50. A central processing unit (CPU), such as in one of the PC Server series of workstations available from International Business Machines Corporation (IBM), or the Poweredge 2200 ("Poweredge 2200" is a trademark of Dell Corporation) server from Dell Corporation, is provided and interconnected to various other components by system bus 12. An operating system 41 runs on CPU 10 and provides control and is used to coordinate the function of the various components of FIG. 2. Operating system 41 may be one of the commercially available operating systems such as Microsoft's Windows NT™), IBM's NetView™ or Novell's NetWare™. UNIX or AIX Network operating systems may also be used. The programming application for controlling all of the entries and consequent network configurations and for allocating and tracking the computer components to be subsequently described for FIGS. 3 through 10, application 40, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries, as well as for part of the stage of data as to allocated computer components to be subsequently described; I/O adapter 18 and communications adapter 34 are also interconnected to system bus 12. It should be noted that software components, including the operating system 41 and the application 40, are loaded into RAM 14, which is the computer system's main memory. I/O adapter 18 conventionally communicates with the disk storage device 20, i.e. a hard drive which may also be involved in the subsequently described storage. Communications adapter 34 interconnects bus 12 with the rest of the local network described in FIG. 1 enabling the data processing system to communicate with its client computers, as well as other servers and client computers to control entry configurations and installations to be subsequently described. Communications adapter 34 will also function to connect server 50 to a network such as the Internet over which additional allocated software computer components may be received if needed.

I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described with respect to the display screens of FIGS. 3 through 10, some simple illustrations of how the data entries are made through which computer components are allocated and tracked so that the resulting data may be used to determine whether resellers should be charged fees. When the screen images are described it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device, such as mouse 26 of FIG. 2 which operates through user interface 22 to call upon programs in RAM 14 cooperating with the operating system 41 to create the images in frame buffer 39 of display adapter 36 to control the display on monitor 38.

As has been set forth hereinabove, the programs to be used by all of the users in the network of FIG. 1 are primarily stored in server 50 and its associated storage facility 59. Now, with respect to FIGS. 3 through 7, we will illustrate some of the data entries used in the process of copending application Ser. No. 09/118,208, solicited from users so that these programs and other computer components may be allocated among the users of the network, and with respect to FIGS. 8 through 10, we will illustrate some entries used in the process of copending application Ser. No. 09/078,934. The illustrations will show allocations within a small business network. Please note with respect to FIG. 1 the data entry panels shown in FIGS. 3 through 10 may be interactively shown to users on display 51 of server 50 or the data entry may be done on any of the displays of clients 53 through 55. The entries may be made by the employees or users themselves or by some sort of supervisory personnel.

Figure 3:
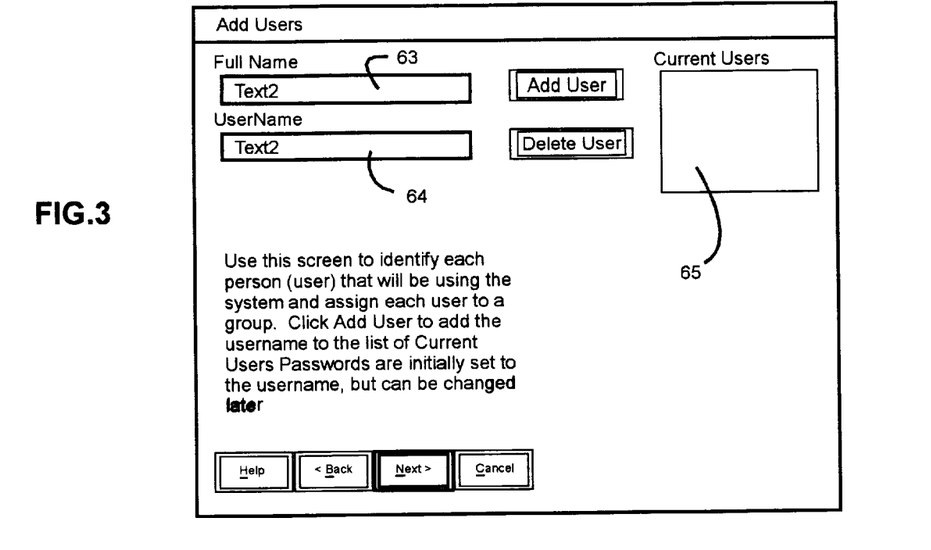
FIG. 3 is a dialog panel for adding users to the network configuration.
Figure 4:
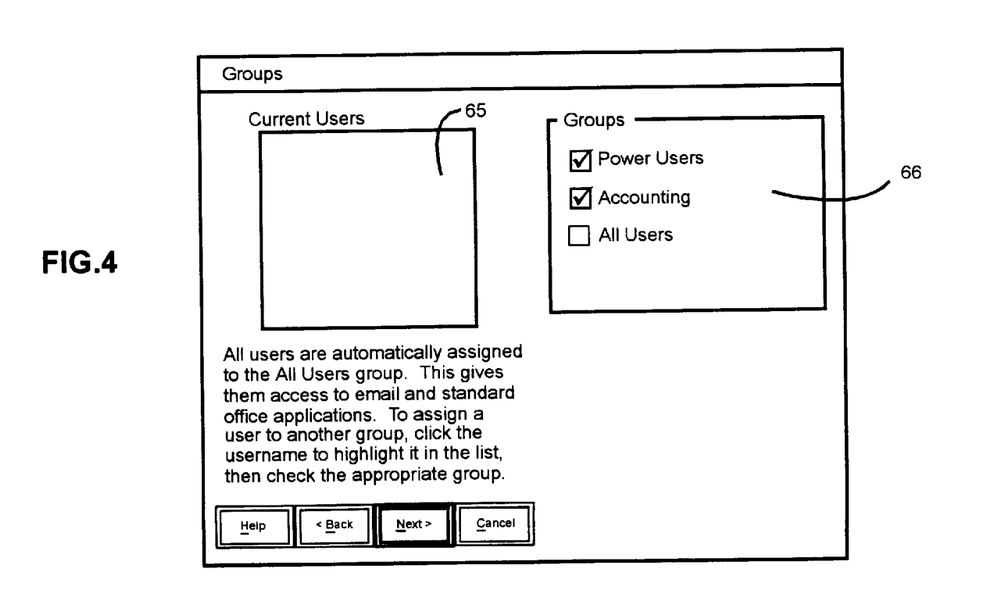
FIG. 4 is an illustrative dialog panel for organizing users according to work groups.
Figure 5:
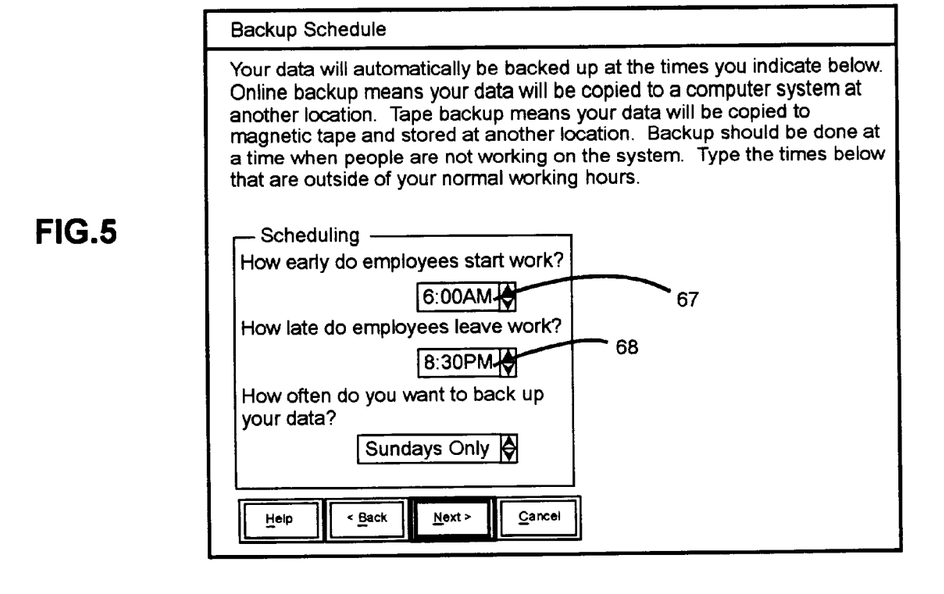
FIG. 5 is an illustrative dialog panel for providing first-in/last-out employee information to provide time for backup and other off-time functions.

FIG. 3 shows a display panel through which the current users 65 may be organized and new users may be entered through data entry fields 63 and 64. FIG. 4 is a display panel through which the users 65 may be assigned to functional groups 66 so that this information may be used to allocate program resources. Next, the user may be prompted with a panel, FIG. 5, which will be used to allocate system backup. It prompts for employee start/leave information via data entry fields 67 and 68 so that this information may be used to set likely computer quiescent periods for backing up stored computer data. Such quiescent periods may also be used for other off use functions such as defragmentation of files stored on disk drives, the general cleaning up of files and other housekeeping functions such as the running of antivirus routines.

Figure 6:
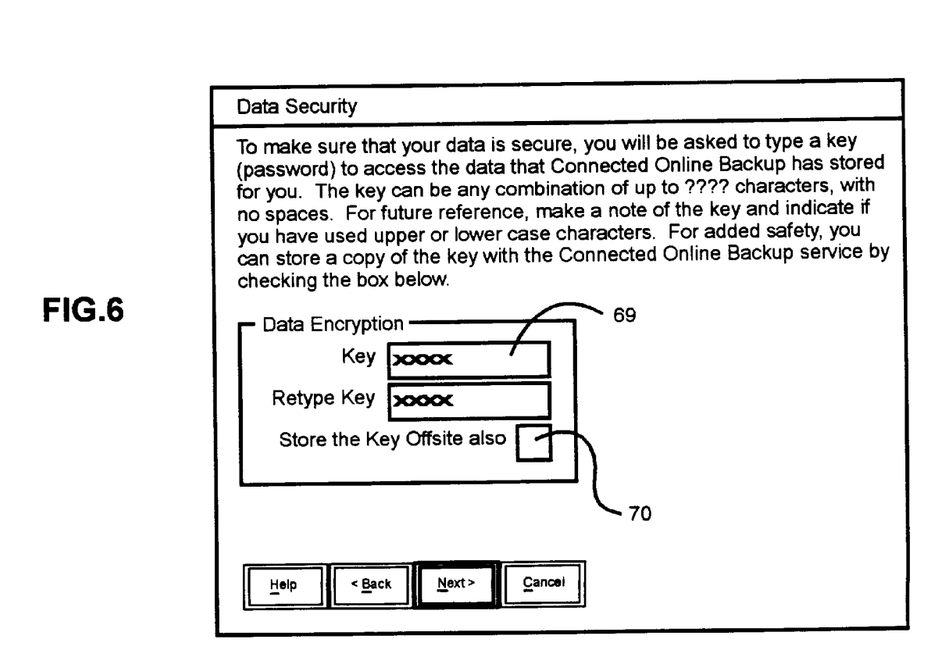
FIG. 6 is an illustrative dialog panel for the setting up of data security.
Figure 7:
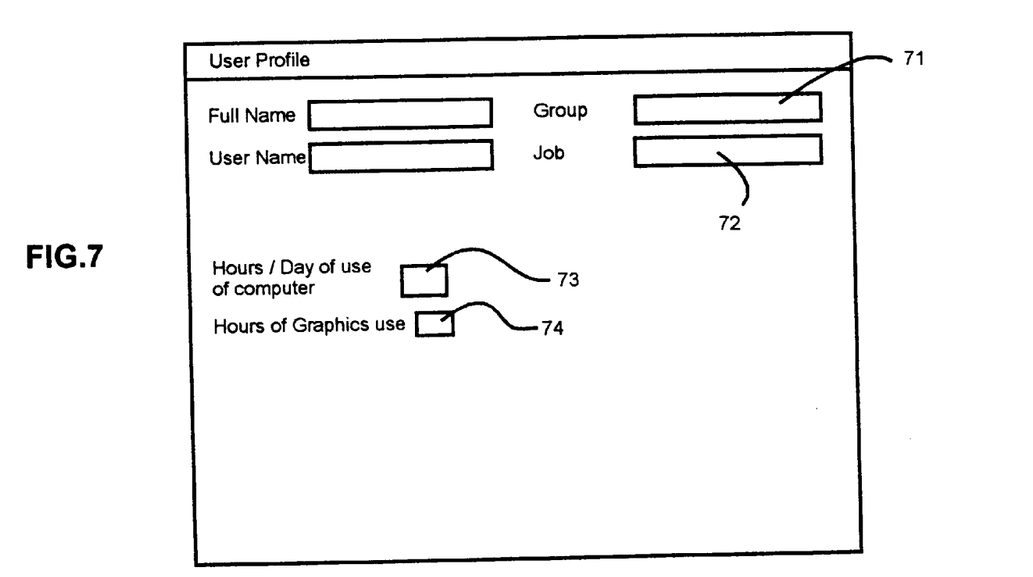
FIG. 7 is an illustrative dialog panel for establishing user profiles.

The user may also be presented with a data security display panel, FIG. 6, in which data encryption key entries 69 and 70 are prompted for. In the data entry panel of FIG. 7, group and job function information entries 71 and 72 are prompted for, which will be used to allocate programs for the particular user. Also, the employee's computer hours are solicited 73, and particularly graphic hours 74 are important since the system may use this information in an algorithm for setting aside storage space to store and support the user's activities.

Figure 8:
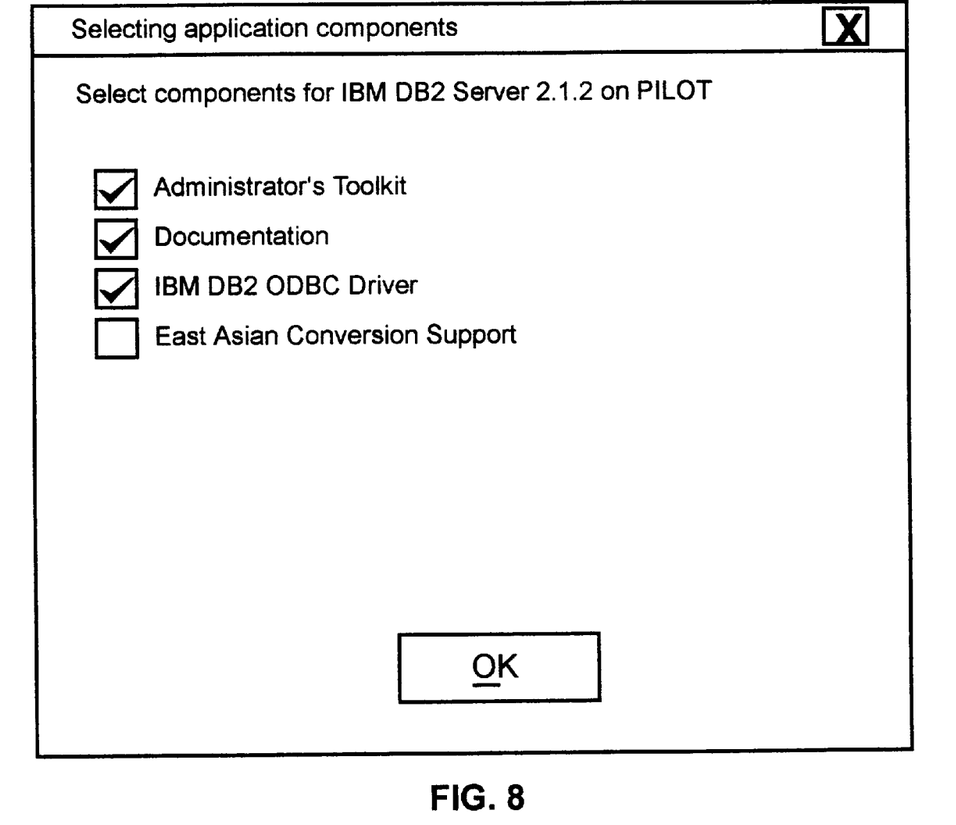
FIG. 8 is a diagrammatic view of an interactive dialog screen on the server for the entry of data relative to another application.
Figure 9:
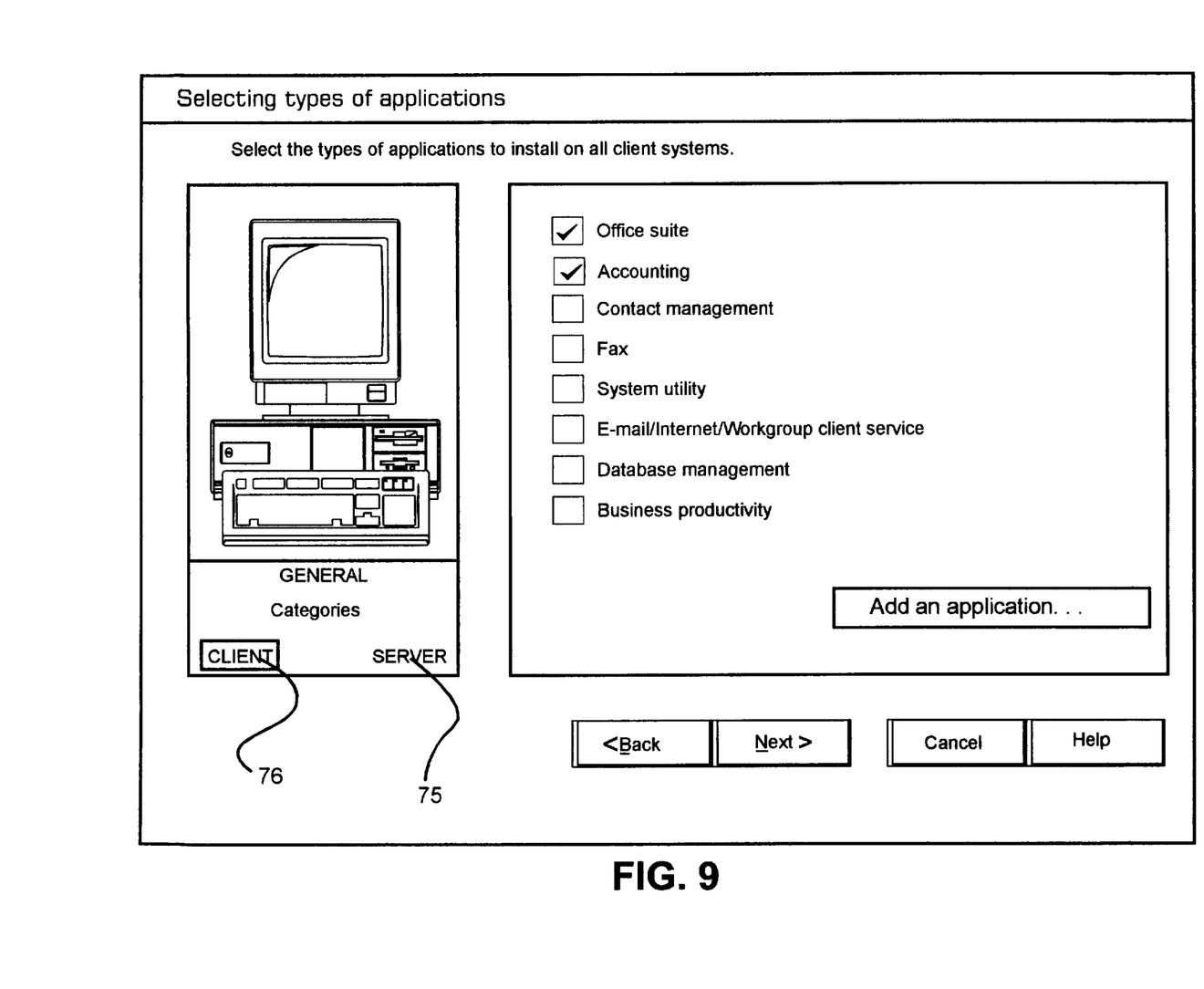
FIG. 9 is a diagrammatic view of an interactive dialog screen on the server for the entry of data relative to application programs to be installed on client computers.
Figure 10:
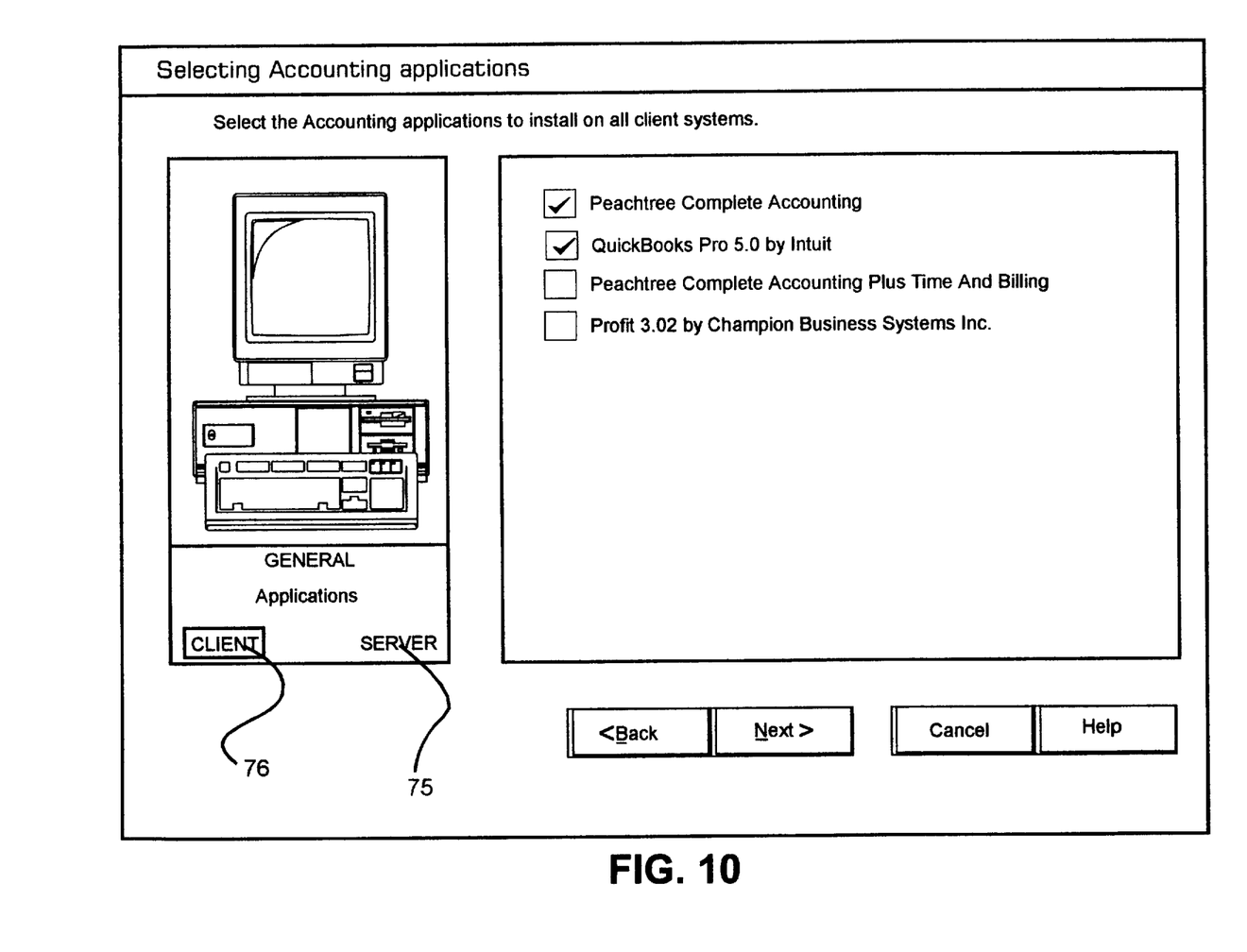
FIG. 10 is a diagrammatic view of an interactive dialog screen on the server for the entry of data relative to an accounting application program to be installed on client computers.

It should be noted that these data entry prompt panels are only a small group of potential data entry screens which may be used to get user data entries from which computer components to be allocated may be determined. For example, FIGS. 8 through 10, illustrate how the present invention may operate using the data entries in the system described in the above-mentioned copending application Ser. No. 09/078,934. FIG. 8 is a data entry panel prompting for database application HE components and drivers' selections for the server computer. Next, the screen of FIG. 9, applications to be installed on client computers are selected and more such selections for client computers are made through the screen of FIG. 10. Note, that these selections are being made for clients is indicated by the activation of client button 76 rather than server button 75.

Figure 11:
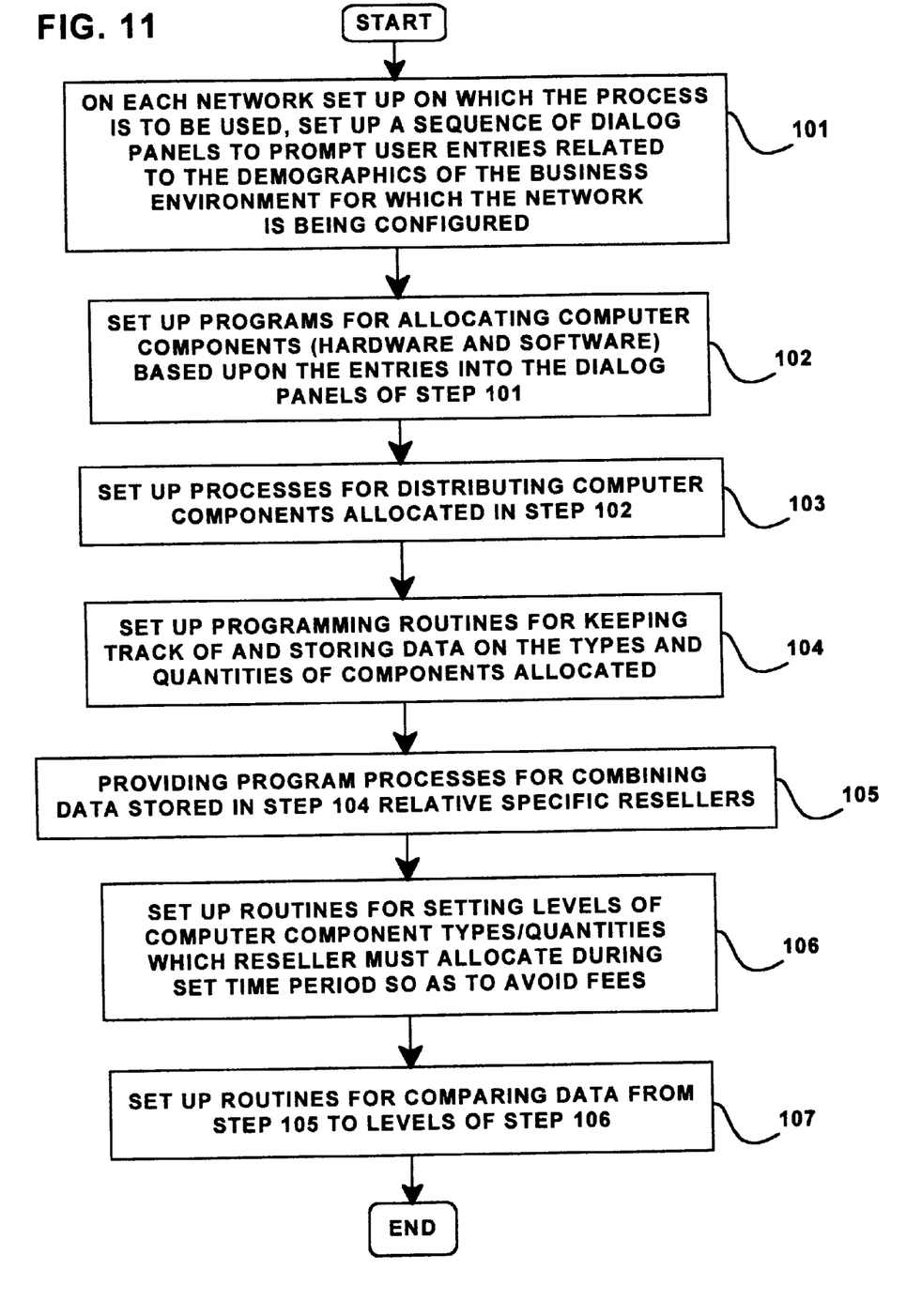
FIG. 11 is a flowchart of the basic elements of the process program carried out by the server computer which enables the server to control the data entry and network configuration including the allocation and tracking of computer components used.

Now, with respect to FIG. 11 there will be generally described the basic elements of the programs which carry out the process of the present invention. Only for purposes of illustrating the present invention using the embodiment of the above-mentioned copending application Ser. No. 09/118, 208, the programs of the present invention will be assumed to be in the server computer which will enable the server to control the data entry and network installation operations described with respect to FIGS. 3 through 10. The server 50, FIG. 1, is set up with a program to display on display 51 a sequence of dialog panels to prompt user entries which are related to the demographics of the business environment for which the network is being configured, step 101. FIGS. 3 through 10 are illustrative of such panels. Then there is set up in the system, step 102, a series of appropriate algorithms for converting the entries, such as those in the panels of FIGS. 3 through 10, into means for allocating appropriate computer components (both hardware and software) for user and client functions. As set forth in the referenced copending application, any number of algorithms could be used for such conversions. Next, step 103, processes are set up for distributing the computer components according to the allocations. In the process of the copending application which deals primarily with software components, these are stored on and distributed through the server computer. As mentioned previously, the distribution may be through the Internet. Also, with hardware components, these could be stored locally or shipped. The computer components could be already in place in their respect computer systems in an inactive state and then activated when allocated. Next, program routines are set up for tracking the allocated types and quantities of components and for storing the tracked data, step 104. Processes are set up, step 105, for combining data stored in step 104 during a plurality of transactions or configurations by the same seller or reseller. In other words, since the present invention involves determination of components installed or allocated from that reseller, some convenient process must be set up to combine such allocation data for that particular reseller. A simple illustration would be to set up a database for that particular seller or reseller which will track the types and quantities of components for the vendor over the time period. Routines are set up for setting levels of computer components types and quantities which the reseller must allocate during fixed time periods so as to avoid fees, step 106. Finally, step 107, routines are set up for comparing the data developed in step 106 to the levels set in step 105 in order to determine whether fees are due.

In connection with the process, it should be noted that the term "sellers" may be used interchangeably with term "resellers". The latter is merely a catch-all term for those who put together computer systems and networks using computer components provided by the manufacturers or the manufacturers' distributors of the computer components.

Now, with respect to FIG. 12 there will be described a modified program run to illustrate many of the steps involved in the prompts, data entries and storage of the entries described above for FIGS. 3 through 10, as well as the allocation, tracking and component allocation level comparisons of the present invention. In this illustrative program run, not all of the possible combinations of data entries will be described. However, it should be readily understood how other selections and data entries discussed with respect to the present invention may be similarly prompted for, selected, stored and used in algorithms.

Figure 12:
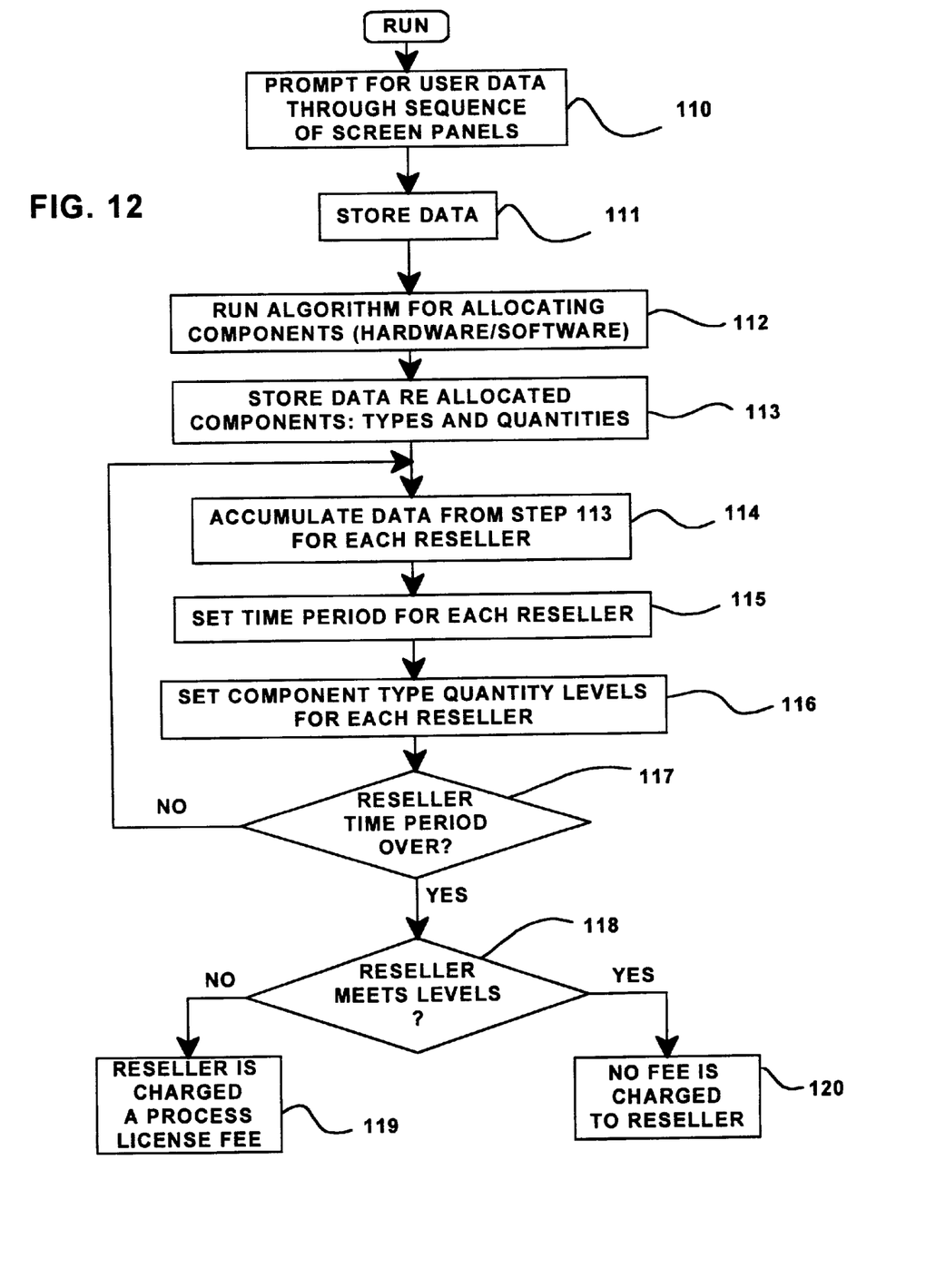
FIG. 12 is a flowchart of a simplified run illustrating the process of FIG. 11.

In the program run of FIG. 12, the operator is prompted for the user or purchaser data described above through a series of screen panels, step 110. The data obtained is stored, step 111. The appropriate algorithms for allocating hardware and software components are run, step 112, after which the data on allocated components, both hardware and software: types and quantities is tracked and stored, step 113. Then, step 114, the stored data developed in step 113 is accumulated and stored for each reseller. Next, a time period is set during which the allocations for each reseller will be measured, step 115, and levels are set, step 116, for the types and quantities of the manufacturer's or distributer's components which the particular reseller must allocate, e.g. install in order for the distributer or manufacturer to economically justify not charging the reseller a fee for the configuration process itself which has been developed and made available by the manufacturer/distributer.

Then, a determination is made as to whether the time period for measuring a particular reseller is over, decision step 117. If No, the process is returned to step 114 and the accumulation continues. If Yes, then a determination is made, step 118, as to whether the allocations by the particular retailer have met the levels set in step 116. If Yes, then step 120, the reseller is not charged any fee. But, if No, then step 119, the reseller is charged a license fee for using the process.

The described implementation of the present invention is as an application program made up of programming steps or instructions. Such a program 40 would be resident in RAM 14 of the server, FIG. 1, during computer operations. Until required by the computer system, the program instructions may be stored in another readable medium, e.g in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a local area network (LAN) or a wide area network (WAN), such as the Internet, when required by the user of the present invention. One skilled in the art should appreciate that the processes controlling the present invention are capable of being distributed in a variety of computer readable media forms.

Although certain preferred embodiments have been shown and described, it will be understood that many changes and modifications may be made therein without departing from the scope and intent of the appended claims.

What is claimed is:

1. In a user interactive display computer process, provided by a distributer of computer components to a seller of computer systems, for configuring computer systems including said computer components, steps comprising:

prompting system purchasers to make a sequence of interactive data entries, each of said entries relative to the data processing needs of the purchaser using one of said computer systems, allocating said computer components to said computer systems based upon said user entries, tracking the quantities of said computer components thereby allocated to computer systems sold by said seller to said purchasers during a selected time period, and determining to forego fees due from said seller to said distributer for said process when said quantities of components thereby allocated during said time period exceed a selected level.

2. The process of claim 1 wherein said data entries cover a demographic aspect of the business environment of the purchaser of the system.

3. The process of claim 1 wherein said allocated computer components are of different types, the quantities of each of said different types are tracked, and said fees are determined to be foregone when the quantity of at least one of said different types of components allocated during said time period exceeds selected levels.

4. In a user interactive display computer process, provided by a distributer of computer components to a seller of computer systems, for configuring a network comprising a server computer and a plurality of client computers including said computer components, steps comprising:

prompting network purchasers to make a sequence of interactive data entries, each of said entries relative to the data processing needs of users of said computers in said network, allocating said computer components within said network upon said entries, tracking the quantities of said computer components thereby allocated to computer networks sold by said seller to said purchasers during a selected time period, and determining to forego fees due from said seller to said distributer for said process when said quantities of components thereby allocated during said time period exceed a selected level.

5. The process of claim 4 wherein said data entries cover a demographic aspect of the business environment of said network.

6. The process of claim 4 wherein said allocated computer components are of different types, the quantities of each of said different types are tracked, and said fees are determined to be foregone when the quantity of at least one of said different types of components allocated during said time period exceeds selected levels.

7. The process of claim 4 wherein said server computer is an interactive display computer and said data entries are made into said server computer and said steps of allocating and tracking are carried out on said server computer.

8. A computer program having program code included on a computer readable medium operable in a user interactive display computer process, provided by a distributer of computer components to a seller of computer systems, for configuring computer systems including said computer components, comprising:

means for prompting system purchasers to make a sequence of interactive data entries, each of said entries relative to the data processing needs of the purchaser using one of said computer systems, means for allocating said computer components to said computer systems based upon said user entries, means for tracking the quantities of said computer components thereby allocated to computer systems sold by said seller to said purchasers during a selected time period, and means determining to forego fees due from said seller to said distributer for said process when said quantities of components thereby allocated during said time period exceeds a selected level.

9. The computer program of claim 8 wherein said data entries cover a demographic aspect of the business environment of the purchaser of the system.

10. The computer program of claim 8 wherein said allocated computer components are of different types, the quantities of each of said different types are tracked by said tracking means, and said fees are determined to be foregone when the quantity of at least one of said different types of components allocated during said time period exceed selected levels.

11. A computer program having program code included on a computer readable medium operable in a user interactive display computer process, provided by a distributer of computer components to a seller of computer systems, for configuring a network having a server computer and a plurality of client computers including said computer components, steps comprising:

means for prompting network purchasers to make a sequence of interactive data entries, each of said entries relative to the data processing needs of users of said computers in said network, means for allocating said computer components within said network upon said entries, means for tracking the quantities of said computer components thereby allocated to computer networks sold by said seller to said purchasers during a selected time period, and means for determining to forego fees due from said seller to said distributer for said process when said quantities of components thereby allocated during said time period exceed a selected level.

12. The computer program of claim 11 wherein said data entries cover a demographic aspect of the business environment of said network.

13. The computer program of claim 11 wherein said allocated computer components are of different types, the quantities of each of said different types are tracked in said tracking means, and said fees are determined to be foregone when the quantity of at least one of said different types of components allocated during said time period exceed selected levels.

14. The computer program of claim 11 wherein said server computer is an interactive display computer and said data entries are made into said server computer and said means for allocating and tracking are in said server computer.

* * * * *